United States Patent [19]
Schaffner et al.

[11] Patent Number: 5,418,813
[45] Date of Patent: May 23, 1995

[54] METHOD AND APPARATUS FOR CREATING A COMPOSITE WAVEFORM

[75] Inventors: Terry M. Schaffner, Palatine; Michael D. Kotzin, Buffalo Grove, both of Ill.; Anthony P. Van den Heuvel, Parkland, Fla.

[73] Assignee: Motorola, Inc., Schaumburg, Ill.

[21] Appl. No.: 163,101

[22] Filed: Dec. 6, 1993

[51] Int. Cl.⁶ .............................................. H04L 27/30
[52] U.S. Cl. ...................................... 375/205; 380/34; 375/206
[58] Field of Search ........................ 375/1, 34; 380/34

[56] References Cited

U.S. PATENT DOCUMENTS

| | | | |
|---|---|---|---|
| 4,979,188 | 12/1990 | Kotzin et al. | 375/34 |
| 5,099,493 | 3/1992 | Zeger | 375/1 |
| 5,193,102 | 3/1993 | Meidan et al. | 375/1 |
| 5,289,499 | 2/1994 | Weerackody | 375/1 |
| 5,329,547 | 7/1994 | Ling | 375/1 |

*Primary Examiner*—Salvatore Cangialosi
*Attorney, Agent, or Firm*—Kevin A. Buford

[57] ABSTRACT

A method and apparatus is provided for creating a composite waveform. This composite waveform is created by coding a plurality of input digital information signals. Subsequently, the plurality of coded input digital information signals are communicated over a communication medium to a digital combiner. The digital combiner combines the plurality of coded input digital information signals. Finally, the digitally combined information signal is spectrally shaped to form a composite waveform. These composite waveform creation principals may be applied to digitally encoded voice subbands in a subband coding system as well as channel information in a direct sequence code division multiple access (DS-CDMA) communication system transmitter.

25 Claims, 3 Drawing Sheets

METHOD AND APPARATUS FOR CREATING A COMPOSITE WAVEFORM

FIELD OF THE INVENTION

The present invention relates to communication systems and, more particularly, to a method and apparatus for creating of a composite waveform.

BACKGROUND OF THE INVENTION

Communication systems take many forms. In general, the purpose of a communication system is to transmit information-bearing signals from a source, located at one point, to a user destination, located at another point some distance away. A communication system generally consists of three basic components: transmitter, channel, and receiver. The transmitter has the function of processing the information signal into a form suitable for transmission over the channel. This processing of the information signal is referred to as modulation. The function of the channel is to provide a physical connection between the transmitter output and the receiver input. The function of the receiver is to process the received signal so as to produce an estimate of the original information signal. This processing of the received signal is referred to as demodulation.

Two types of two-way communication channels exist, namely, point-to-point channels and point-to-multipoint channels. Examples of point-to-point channels include wirelines (e.g., local telephone transmission), microwave links, and optical fibers. In contrast, point-to-multipoint channels provide a capability where many receiving stations may be reached simultaneously from a single transmitter (e.g., cellular radio telephone communication systems). These point-to-multipoint systems are also termed Multiple Access Systems (MAS).

Analog and digital transmission methods are used to transmit an information signal over a communication channel. The use of digital methods offers several operational advantages over analog methods, including but not limited to: increased immunity to channel noise and interference, flexible operation of the system, common format for the transmission of different kinds of information signals, improved security of communication through the use of encryption, and increased capacity. These advantages are attained at the cost of increased system complexity. However, through the use of very large-scale integration (VLSI) technology, a cost-effective way of building the hardware has been developed.

To transmit an information signal (either analog or digital) over a bandpass communication channel, the information signal must be manipulated into a form suitable for efficient transmission over the channel. Modification of the information signal is achieved by means of a process termed modulation. This process involves varying some parameter of a carrier wave in accordance with the information signal in such a way that the spectrum of the modulated wave matches the assigned channel bandwidth. Correspondingly, the receiver is required to re-create the original information signal from a degraded version of the transmitted signal after propagation through the channel. The recreation is accomplished by using a process known as demodulation, which is the inverse of the modulation process used in the transmitter.

In addition to providing efficient transmission, there are other reasons for performing modulation. In particular, the use of modulation permits multiplexing, that is, the simultaneous transmission of signals from several information sources over a common channel. Also, modulation may be used to convert the information signal into a form less susceptible to noise and interference.

For multiplexed communication systems, the system typically consists of many remote units (i.e., subscriber units). Each subscriber unit requires a communication channel for short or discrete intervals of time rather than continuous service on a communication channel at all times. Therefore, communication systems have been designed to incorporate the characteristic of communicating with many remote units for brief intervals of time on the same communication channel. These systems are termed time division multiple access communication systems.

A Direct Sequence (DS) Code Division Multiple Access (CDMA) system is a MAS where all subscriber units transmit information signals on the same frequency band simultaneously. Similarly, base stations transmit information signals intended for a particular subscriber unit by transmitting the information signals on the same frequency band as base station originated transmissions to other subscriber units. By necessity, the transmitted bandwidth from a base station is much larger than the information rate of the information signal, i.e. carrier bandwidth is large compared to the message bandwidth.

Most MAS use a digitized representation of voice as the information signal which must be transmitted. This type of information signal is typically produced by a speech coder. It will be appreciated by those skilled in the art that the information signal may also be derived from a data signal such as from a computer modem or data network. A base station typically accepts many information signals as input. In addition, each input signal originates from either a land based telephone or a mobile subscriber unit. Each information signal is multiplexed such that a single modified information signal is transmitted to a base station antenna at a comparatively high data rate. Various stages between the input of the information signals to antenna transmission are susceptible to noise on account of the high data rates involved and the close proximity of signal carrying conductors within the base station. The resulting effect is that capacitive or inductive crosstalk often occurs. As a result, it is desirable to achieve the highest possible utilization of the available carrier bandwidth while minimizing any errors or noise from occurring in the information signal.

Some CDMA system base stations transmit a pilot channel which aids a mobile subscriber in acquiring and tracking a voice channel. A conventional CDMA system provides the pilot channel generating function by a printed circuit board identical to the printed circuit boards used to provide voice and data channels. The output signals of each board is then converted from digital to analog signals. The signals are then combined by a functionally distinct combining circuit.

Conventional CDMA systems route the pilot channel and the voice channels to separate digital to analog converters. This introduces time skew between the pilot channel and the voice channel. If the time skew is large enough, it will create phase inaccuracies in the coherent demodulator of the mobile subscriber unit, thereby decreasing the voice channel performance.

However, even in view of the above-described conventional CDMA communication system, a need still exists for an improved digital information signal combining technique which can be applied to CDMA as well as other types of communication systems.

SUMMARY OF THE INVENTION

A method and apparatus is provided for creating a composite waveform. This composite waveform is created by coding a plurality of input digital information signals. Subsequently, the plurality of coded input digital information signals are communicated over a communication medium to a digital combiner. The digital combiner combines the plurality of coded input digital information signals. Finally, the digitally combined information signal is spectrally shaped to form a composite waveform. These composite waveform creation principals may be applied to digitally encoded voice subbands in a subband coding system as well as channel information in a direct sequence code division multiple access (DS-CDMA) communication system transmitter.

DETAILED DESCRIPTION

The need for an improved digital information signal combining technique is met, as described below, by a method and apparatus which modifies a voice information signal in two stages. The information signal is comprised of data bits which are input to an encoder, which encodes the bits to a higher data rate. Subsequently, forward error correction is introduced to the resultant signal as is data governing the power control of a radio communication subscriber unit transmitter. In addition, the signal is scrambled. Further, an orthogonal Walsh code covers the signal. The first stage culminates in combining the information signal with a number of other information signals from other subscriber units. The resultant signal is then communicated to a second stage.

The second stage combines a large number of signals that have originated from an equal number of first stages. The number of signals input to the second stage is large as compared to the number of signals combined in the first stage. Finally, the generated signal is digitally spread and filtered by a band limiting filter. The signals output from the second stage are converted to analog signals. The analog signals are band pass filtered, modulated to the RF carrier, amplified and transmitted by three 120° sector cell antennae for either sector α, β or γ respectively.

By centralizing the band limiting filter as opposed to filtering each channel separately, the total amount of circuitry is reduced and quantization noise is reduced. In addition, since all channels are combined prior to digital to analog conversion, fewer digital to analog converters are necessary. As a final measure, routing a combined voice channel and pilot channel to a single digital to analog converter reduces any time skew between the pilot channel and voice channels inherent in prior art systems that route voice channels through separate digital to analog converters than the pilot channel.

Figure 1:
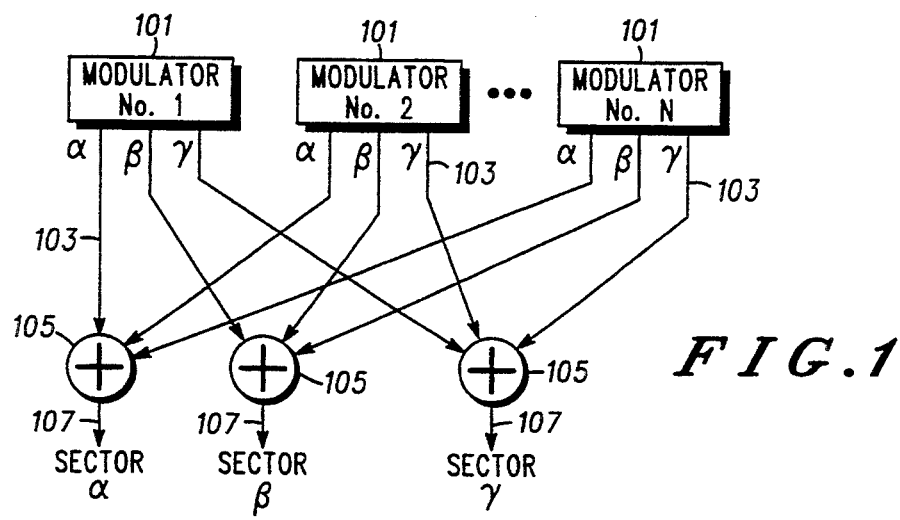
FIG. 1 is a block diagram showing a preferred embodiment connection of a Modem Channel Card (MCC) which supplies information to a Baseband Distribution and Combiner (BDC) which then supplies modified information signals to an antenna in accordance with the present invention.

Referring now to FIG. 1, the system architecture of a three-sector base station may be seen. Three Modem Channel Cards (MCC) 101 are shown. However, it will be appreciated by those skilled in the art that more MCCs (e.g. twenty MCCs) are typically used in a base station. Each MCC 101 takes four digitally encoded voice signals as input. Each voice signal arrives at a rate of 9.6 kilobits per second (Kbps). The MCC 101 performs various operations on the signals and communicates the multiplexed signals 103 to a Baseband Distribution and Combiner (BDC) cards at a rate of 1.288 megasymbols per second (Msym/s). Each BDC 105 accepts several other signals (e.g. 17 signals in addition to the 3 signals shown in FIG. 1) at a rate matching the rate of the first MCC multiplexed signal.

The BDC 105 performs pseudo-noise (PN) spreading and upsample filters the signal, thereby producing a quadraphase pair of channels 107 suitable for quadrature phase shift keying (QPSK) modulating an analog carrier signal. Further operations occur subsequent to BDC signal processing, such as amplifying the signal. The subsequent signal is Low Pass Filtered and amplified by means well known in the art. The amplified signal is radiated by the one antenna (e.g. sector ω) that is operatively coupled to the BDC.

Figure 2:
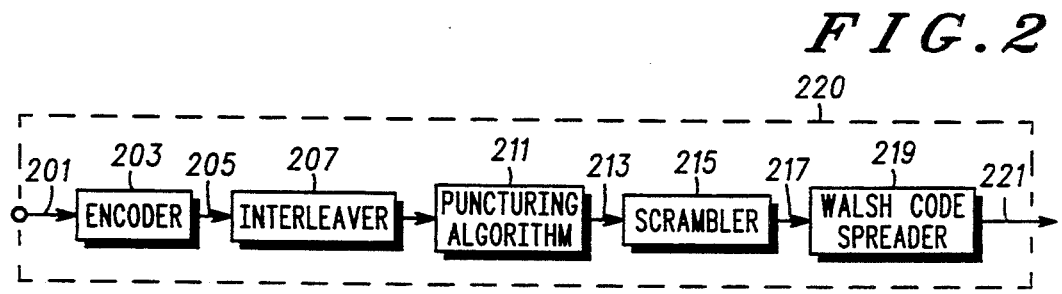
FIG. 2 is a detailed block diagram showing a portion of the preferred embodiment MCC shown in FIG. 1 in accordance with the present invention.

Referring now to FIG. 2 which shows the digital modulator portion 220 of the MCC 101, digitally encoded voice signals 201 are input to an encoder at a rate of 9.6 Kbps. The encoder increases the data rate by a predetermined factor. In the preferred embodiment, the predetermined factor is two, thereby making the output rate 19.2 Ksym/s. The output from the encoder is in the form of data symbols. The data symbols 205 are then input into an interleaver 207. Interleaver 207 block interleaves the input data symbols 205. In the interleaver 207, the data symbols are input column by column into a matrix and output from the matrix row by row. The interleaved data symbols 213 are output by the interleaver 207 at the same data symbol rate that they were input (e.g., 19.2 ksym/s).

The interleaved data symbols 213 are output to a puncturing algorithm 211. The puncturing algorithm receives a periodic power adjustment command once every 1.25 milliseconds. The power adjustment command is one or more bits of information. The puncturing algorithm overwrites one or more interleaved data symbols with each power adjustment command. The overwrite by the power adjustment command is treated as an erasure and is corrected by the error correction as decoded in the mobile unit receiver. The resultant interleaved data symbols 213 are output to a scrambler 215.

The scrambler enhances the security of the communication in the voice channel. The scrambler enhances security by use of a long PN code, exclusive-ORed with the interleaved data symbols. The scrambler outputs the result as scrambled data symbols.

Walsh code spreader 219 provides a unique user code that further spreads the scrambled data symbols. Walsh codes are generated by techniques that are well known in the art. The preferred embodiment uses Walsh codes generated by a Walsh function of order 64. The effect of the Walsh code spreading is to increase the symbol rate by a factor of 64. The Walsh code spreader 219 outputs symbols 221 at a rate of 1.228 Msym/s.

Figure 3:
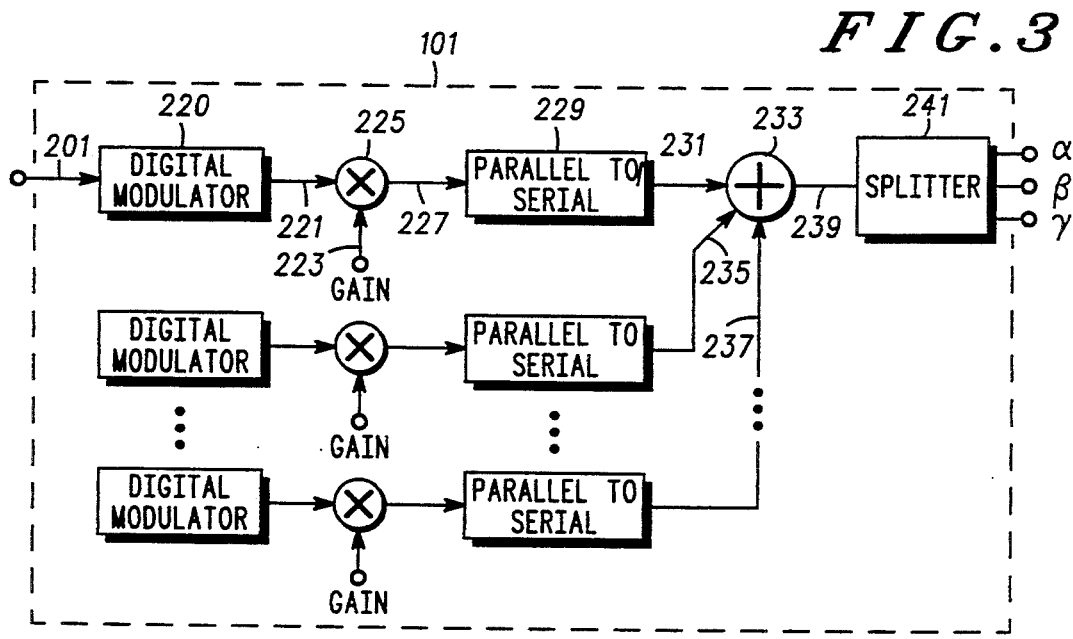
FIG. 3 is a detailed block diagram of another portion of the preferred embodiment MCC shown in FIG. 1 in accordance with the present invention.

Referring now to FIG. 3 which shows a detailed view of the other portions of the MCC 101 besides the digital modulator portion 220 which was shown in FIG. 2, gain adjustment commands 223 are inserted into the Walsh code spread signal 221 which provide a subscriber unit with appropriate instructions for subscriber to base site (i.e., uplink) power control. The Walsh code spread signal 221 is multiplied by the appropriate gain for the channel by multiplier 225. The gain is based on the forward power control level for the channel and the current transmit bit rate. The resultant signal is a multiplied signal 227 consisting of a nine bit signed two's complement integer.

The nine bit signed two's complement integer is input to a parallel to serial converter 229 which produces a single channel serial bit stream 231. The single channel serial bit stream 231 of the particular voice channel is then input to a serial adder 233, along with several other serial bit streams 235, 237 of other voice channels. The preferred embodiment MCC 101 adds four single channel serial bit streams in this manner. Output 239 from the serial adder 233 is split by splitter 241 into antenna sector components $\alpha$, $\beta$, and $\gamma$, which are communicated across a communication medium (i.e., a base station serial wireline backplane) to the second stage of signal modification as a multiplexed signal. Each multiplexed signal is distributed to a primary BDC 105 which completes the voice channel combining and modulation of the signals in preparation for radio frequency transmission to each of three cell site sectors $\alpha$, $\beta$, and $\gamma$. It will be appreciated by those skilled in the art that fewer or more antenna sectors may be implemented without departing from the scope or spirit of the present invention.

Figure 4:
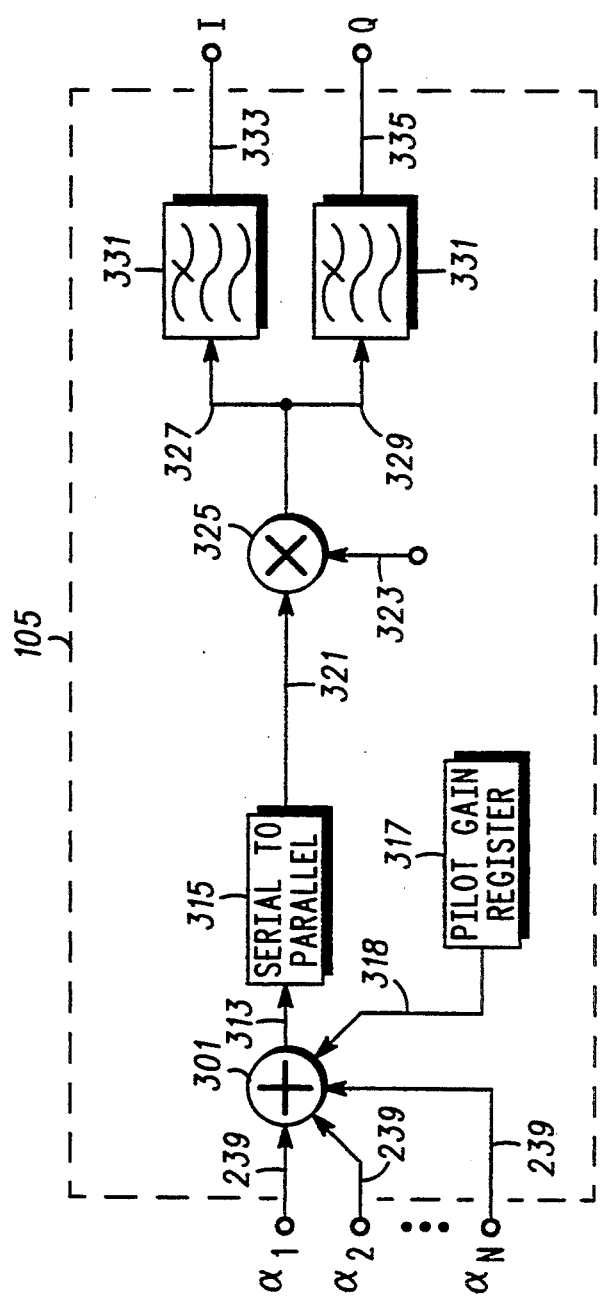
FIG. 4 is a detailed block diagram showing the preferred embodiment BDC shown in FIG. 1 in accordance with the present invention.

Referring now to FIG. 4, there is shown an $\alpha$ antenna sector BDC 105 which is one of three BDC's used for each base station cell site. Each of the three BDC circuits preferably are implemented on a single printed circuit board to reduce component complexity at the base site. Each BDC circuit corresponds to either sector co, $\alpha$, $\beta$ or $\gamma$ respectively. A serial modulo-2 adder 301 accepts several multiplexed signals 239 (e.g., 20 $\alpha$ antenna sector signals) as input. In addition, a pilot channel is added to the combined signal 313. The pilot channel contains no data modulation and is characterized as an unmodulated spread spectrum signal that all the users of a particular cell-site or sector use for acquisition or tracking purposes. In generating the pilot signal, the Walsh "zero" ($W_0$) sequence which consists of all zeros is used so as not to modulate the pilot signal. Pilot gain register 317 generates a Walsh "zero" ($W_0$) sequence. The output of the pilot gain register 317 is input to the serial modulo-2 adder 301. The serial modulo-2 adder 301 outputs a pilot augmented signal 321. The pilot augmented signal 321 is converted from serial to parallel signals by serial to parallel converter 315.

Digital Quadrature Phase Shift Key (QPSK) spreading is the next process to be performed. It will be appreciated by one skilled in the art that more or less than four phase shifted signals may be used to modulate the pilot augmented signal 321 (e.g. biphase shift keying (BPSK) could be used). More precisely, any number of phase shifted signals may be utilized in an M-ary phase shift keyed modulating scheme, wherein 'M' denotes the number of phases utilized by the modulating scheme.

Complex QPSK PN spreader 323 provides an In-Phase (I) and Quadrature (Q) channels which are multiplied by binary multiplier 325 with the pilot augmented signal 321. As a result, two outputs are produced, i.e. the I-channel and Q-channel. Each of the I-channel 327 and Q-channel 329 are filtered by identical bandwidth limiting Finite Impulse Response (FIR) filters 331. The FIR filters 331 four times upsample the input signal and low pass filter the result to produce two signals: a filtered I-channel 333 and a filtered Q-channel 335.

Further processing of the signals to produce an amplified RF signal is well known in the art. The filtered I-channel and filtered Q-channel are converted to analog signals. In addition, the filtered I-channel and filtered Q-channel are spectrally shaped by a band pass filter. Subsequently the signals are modulated to the RF carrier, amplified and transmitted by the sector antennae for either sector $\alpha$, $\beta$ or $\gamma$, respectively.

It will be appreciated by those skilled in the art that the teachings of the present invention may also be applied to provide computationally efficient combining of coded speech information received from different sources. A need for such combining in telephony or land mobile console applications where it is desired to combine separately received user's speech into a single composite that allows all received parties to be heard simultaneously. In telephony, conferencing allows more than two users to simultaneously converse and hear each of the other parties as they speak. In land mobile, a console operator may simultaneously monitor a plurality of radio frequencies using voice and it is necessary to hear all received waveforms superimposed. This capability is also known as N-way conferencing, where N is the number of independent channels combined.

The present invention is particularly applicable to the combining of speech information that is received in coded form. One common speech coder, for example, is the subband coder. One embodiment of such a coder is described, for example, in U.S. Pat. No. 4,979,188 by Kotzin, et. al., which is incorporated herein by reference. It is well known in the art that a subband speech coder conveys information between a transmitter and receiver by coding spectral bands of information separately. In a subband coder, speech samples corresponding to different spectral subbands are separated from the original input and coded for transmission. Such coders employ a plurality of additional techniques, such as noise masking, to improve the quality of the reconstructed speech.

Figure 5:
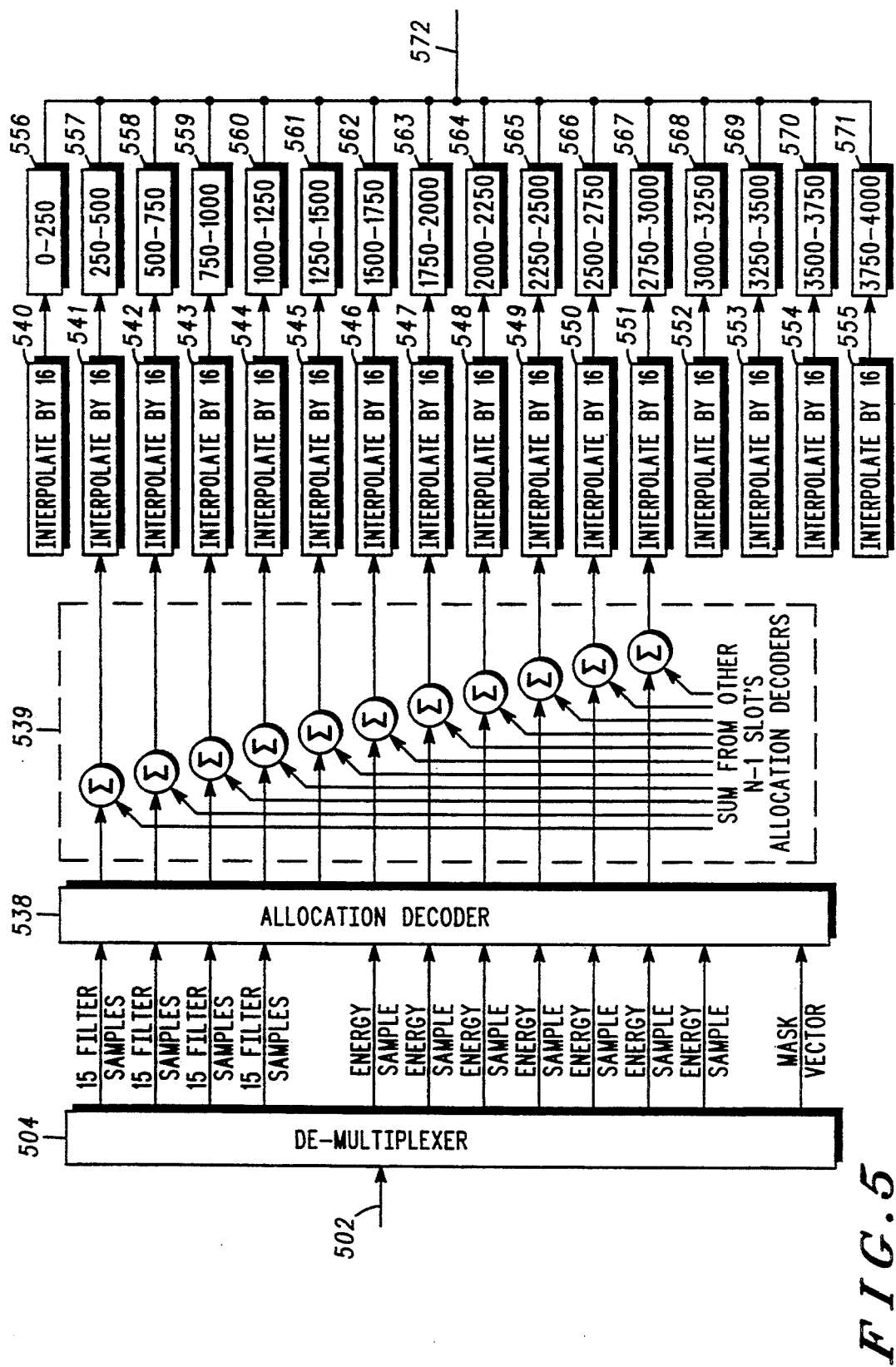
FIG. 5 is a block diagram showing an alternative preferred embodiment application of digital combining principals to a speech coder in accordance with the present invention.

One Figure from the Kotzin et al. '188 patent, included herein as FIG. 5, shows the preferred embodiment of one such decoder that might be utilized to create one such reconstructed speech output from a single coded received input. Information 502 from a transmission channel is demultiplexed in 504, splitting the information into various baseband samples associated with separate spectral subbands, and various side information. The side information, among other things, allow the baseband samples to be properly allocated to the appropriate reconstruction filtering to is used to enable the aforementioned improvement techniques. Proper scaling is performed on the samples, and noise samples might be provided to unused subbands. This is accomplished in allocation decoder 538. The subband samples are directed to the appropriate spectral shaping filters 558–571 via an interpolation stage 540–555. The spectral shaping may be performed by polyphase antialiasing FIR filter banks. The independent subbands outputs are combined to create the reconstructed speech output (572).

A straightforward approach to providing N-way conferencing would be to replicate the decoder shown N times, once for each independent input. The outputs could then be simply combined to create a composite waveform.

This alternative preferred embodiment application greatly reduces the computational burden of providing N-way conferencing by this straightforward approach. The basic concept is to combine the multiple speech inputs before the bulk of the computations are performed, namely, before the interpolation and decoder filter bank stages. Each independent channel has its own demultiplexer 504, which separates the subband samples from the side information. An allocation decoder 538, in conjunction with received side information, scales and directs the samples to the appropriate spectral subband channel. Additional noise fill samples for other unused subbands might also be provided. The demultiplexer 504 and allocation decoder 538 is shown for only a single voice in FIG. 5. The side information, among other things, allows proper allocation and amplitude scaling of the filter samples so that the filter samples for this speech input can be properly directed to the interpolation 540–555 and spectral shapers 556–571 to allow speech reconstruction.

However, as shown in FIG. 5, before the interpolation 540–555 and spectral shaping 556–571, properly scaled samples from the (N-1) other speech inputs are combined 539 together. This is done separately for each of the possible subbands. Actual speech samples and noise fill may be treated similarly.

Modifications are possible at the intermediate point to optimize the combining for a N-way conferencing scenario. For example, it is possible to scale each of the subband inputs by the energy in its respective signal. This acts to reduce excess residual noise from accumulating but still allows all speech input to be simultaneously combined. The savings using the aforementioned technique are substantial. At most, only one set of decoding filters needs to be provided verses N times that number using traditional techniques.

The principles described herein can be summarized as follows. Referring now to FIG. 1, a method of creating a composite waveform is shown which includes coding 101 a plurality of input digital information signals. Each input digital information signal may be either digitally encoded voice, data packets, or a combination thereof. Alternatively, each input digital information signal may be derived from a particular subband of a subband coder. Further, each input digital information signal may consist of digital samples representing spectrally partitioned portions of independent information sources (i.e., different voices in a conference circuit). Subsequently, this plurality coded input digital information signals are communicated over a communication medium 103 to a digital combiner 105. The plurality of coded input digital information signals are digitally combined by the digital combiner 105 and this digitally combined information signal is spectrally shaped to form a composite waveform 107,.

More precisely, a direct sequence code division multiple access (DS-CDMA) transmitter which digitally combines channel information is shown in FIGS. 1–4. The transmitter includes a first and a second channel encoder 101 for channel coding a first and a second input digital information signal, respectively. Each input digital information signal may include digitally encoded voice, data packets, or any combination thereof. Each channel encoder 101 comprises a splitter 241 for splitting the channel coded digital information signal into sector components α, β, and γ for each sector of a cell. Also, each channel encoder 101 may include a gain controller 225 for adjusting a power gain of the channel coded digital information signal. Further, each channel encoder 101 includes a converter 229 for converting the sector components of the channel coded digital information signal from a parallel to a serial signal. Furthermore, each channel encoder 101 comprises apparati for convolutional encoding 203, block interleaving 207, long pseudo-noise code scrambling 215, and Walsh code spreading 219 each input digital information signal 201. Finally, each channel encoder 101 may include a mechanism 211 for implementing a puncture algorithm to insert uplink power control information into the digital information signal.

In addition, a combiner 105 is operatively coupled to the first and the second channel encoder 101 for separately serially adding 301 together each sector component of the first and the second channel coded input digital information signals. The combiner 105 includes a mechanism 318 for adding a pilot control channel 317 to the first and the second channel coded input digital information signal. In addition, the combiner 105 comprises a converter 315 for converting each sector component of the digitally combined channel coded digital information signal from a serial to a parallel signal. A modulator 325 is operatively coupled to the converter 315 for separately M-ary phase shift keying each sector component of the digitally combined input digital information signal. In addition, a filter 331 is operatively coupled to the modulator 325 for separately baseband spectrally shaping each sector component of the M-ary phase shift keyed digital information signal to limit the bandwidth of a downlink transmission signal.

The DS-CDMA transmitter preferably further includes an analog transmission portion operatively coupled to the filter 331 which upconverts the M-ary phase shift keyed digital information signal to a radio frequency downlink transmission signal, power amplifies the radio frequency downlink transmission signal, and radiates the amplified radio frequency downlink transmission signal from an antenna.

Although the invention has been described and illustrated with a certain degree of particularity, it is understood that the present disclosure of embodiments has been made by way of example only and that numerous changes in the arrangement and combination of parts as well as steps may be resorted to by those skilled in the art without departing from the spirit and scope of the invention as claimed. For example, the modulator, antennas and demodulator portions of the preferred embodiment communication system as described were directed to CDMA spread-spectrum signals transmitted over a radio communication channel. However, as will be understood by those skilled in the art, the encoding and decoding techniques described and claimed herein can also be adapted for use in other types of transmission systems like those based on time division multiple access (TDMA) and frequency division multiple access (FDMA). In addition, the communication medium (i.e., the radio channel) could alternatively be an electronic data bus, wireline, optical fiber link, satellite link, or any other type of communication channel.

What is claimed is:

1. A method of digitally combining channel information in a direct sequence code division multiple access (DS-CDMA) communication system, comprising:
   (a) channel coding a plurality of input digital information signals;
   (b) communicating the plurality channel coded input digital information signals to a digital combiner;
   (c) digitally combining the plurality of channel coded input digital information signals with the digital combiner;
   (d) M-ary phase shift keying the digitally combined input digital information signal; and
   (e) baseband spectrally shaping the M-ary phase shift keyed digital information signal to limit the bandwidth of a downlink transmission signal.

2. The method of claim 1 wherein each input digital information signal comprises information selected from the group consisting of digitally encoded voice and data packets.

3. The method of claim 1 wherein the step of channel coding comprises convolutional encoding, block interleaving, long pseudo-noise (PN) code scrambling, and Walsh code spreading each input digital information signal.

4. The method of claim 1 wherein the step of channel coding comprises implementing a puncture algorithm to insert uplink power control information into each digital information signal.

5. The method of claim 1:
   (a) further comprising the step of splitting each of the plurality of channel coded digital information signals into sector components for each sector of a cell prior to the step of communicating; and
   (b) the steps of digitally combining, M-ary phase shift keying, and baseband spectrally shaping are separately performed on each sector component.

6. The method of claim 1 further comprising the step of adjusting a power gain of the channel coded digital information signal prior to the step of communicating.

7. The method of claim 1:
   (a) further comprising the step of converting each of the plurality of channel coded digital information signals from a parallel to a serial signal prior to the step of communicating;
   (b) the step of digitally combining comprises serially adding together the plurality of channel coded digital information signals; and
   (c) further comprising the step of converting the digitally combined channel coded digital information signal from a serial to a parallel signal prior to the step of M-ary phase shift keying.

8. The method of claim 1 wherein the step of digitally combining comprises adding a pilot control channel to the plurality of channel coded input digital information signals.

9. The method of claim 1 further comprising the steps of:
   (a) upconverting the M-ary phase shift keyed digital information signal to a radio frequency downlink transmission signal;
   (b) power amplifying the radio frequency downlink transmission signal; and
   (c) radiating the amplified radio frequency downlink transmission signal from an antenna.

10. A method of digitally combining channel information in a direct sequence code division multiple access (DS-CDMA) communication system, comprising:
    (a) channel coding a plurality of input digital information signals;
    (b) splitting each of the plurality of channel coded digital information signals into sector components for each sector of a cell;
    (c) converting each sector component of the plurality of channel coded digital information signals from a parallel to a serial signal;
    (d) communicating the sector components of the plurality channel coded input digital information signals to a digital combiner;
    (e) digitally combining by sector the sector components of the plurality of channel coded input digital information signals with the digital combiner through a serial addition process;
    (f) converting by sector the digitally combined channel coded digital information signal from a serial to a parallel signal;
    (g) M-ary phase shift keying by sector the digitally combined input digital information signal; and
    (h) baseband spectrally shaping by sector the M-ary phase shift keyed digital information signal to limit the bandwidth of a downlink transmission signal.

11. The method of claim 10 wherein the step of channel coding comprises convolutional encoding, block interleaving, long pseudo-noise (PN) code scrambling, and Walsh code spreading the input digital information signal.

12. The method of claim 10 wherein the step of channel coding comprises implementing a puncture algorithm to insert uplink power control information into the digital information signal.

13. The method of claim 10 further comprising the step of adjusting a power gain of the channel coded digital information signal prior to the step of communicating.

14. The method of claim 10 wherein the step of digitally combining comprises adding a pilot control channel to the plurality of channel coded input digital information signals.

15. The method of claim 10 further comprising the steps of:
    (a) upconverting by sector the M-ary phase shift keyed digital information signal to a radio frequency downlink transmission signal;
    (b) power amplifying by sector the radio frequency downlink transmission signal; and
    (c) radiating by sector the amplified radio frequency downlink transmission signal from an antenna.

16. A direct sequence code division multiple access (DS-CDMA) transmitter which digitally combines channel information, comprising:
    (a) a first and a second channel means for channel coding a first and a second input digital information signal, respectively;
    (b) combiner means, operatively coupled to the first and the second channel means, for digitally combining the first and the second channel coded input digital information signals;

(c) modulation means, operatively coupled the combiner means, for M-ary phase shift keying the digitally combined input digital information signal; and (d) filter means, operatively coupled to the modulation means, for baseband spectrally shaping the M-ary phase shift keyed digital information signal to limit the bandwidth of a downlink transmission signal.

17. The direct sequence code division multiple access (DS-CDMA) transmitter of claim 16 wherein each input digital information signal comprises information selected from the group consisting of digitally encoded voice and data packets.

18. The direct sequence code division multiple access (DS-CDMA) transmitter of claim 16 wherein each channel means comprises means for convolutional encoding, block interleaving, long pseudo-noise (PN) code scrambling, and Walsh code spreading the input digital information signal.

19. The direct sequence code division multiple access (DS-CDMA) transmitter of claim 16 wherein each channel means comprises means for implementing a puncture algorithm to insert uplink power control information into the digital information signal.

20. The direct sequence code division multiple access (DS-CDMA) transmitter of claim 16 wherein:

(a) each channel means comprises means for splitting each channel coded digital information signal into sector components for each sector of a cell;

(b) the combiner means comprises means for separately digitally combining each sector component;

(c) the modulation means comprises means for separately M-ary phase shift keying each sector component; and (d) the filter means comprises means for separately baseband spectrally shaping each sector component.

21. The direct sequence code division multiple access (DS-CDMA) transmitter of claim 16 wherein each channel means comprises means for adjusting a power gain of the channel coded digital information signal.

22. The direct sequence code division multiple access (DS-CDMA) transmitter of claim 16 wherein:

(a) each channel means comprises means for converting the channel coded digital information signal from a parallel to a serial signal; and (b) the combiner means comprises means for serially adding together the first and the second channel coded digital information signal and means for converting the digitally combined channel coded digital information signal from a serial to a parallel signal.

23. The direct sequence code division multiple access (DS-CDMA) transmitter of claim 16 wherein the combiner means comprises means for adding a pilot control channel to the first and the second channel coded input digital information signal.

24. The direct sequence code division multiple access (DS-CDMA) transmitter of claim 16 further comprising an analog transmission portion which upconverts the M-ary phase shift keyed digital information signal to a radio frequency downlink transmission signal, power amplifies the radio frequency downlink transmission signal, and radiates the amplified radio frequency downlink transmission signal from an antenna.

25. A direct sequence code division multiple access (DS-CDMA) transmitter which digitally combines channel information, comprising:

(a) a first and a second channel encoder for channel coding a first and a second input digital information signal, respectively, each channel encoder comprising a splitter for splitting the channel coded digital information signal into sector components for each sector of a cell, each channel encoder further comprising a converter for converting the sector components of the channel coded digital information signal from a parallel to a serial signal;

(b) a combiner, operatively coupled to the first and the second channel encoder, for separately serially adding together each sector component of the first and the second channel coded input digital information signals, the combiner comprising a converter for converting each sector component of the digitally combined channel coded digital information signal from a serial to a parallel signal;

(c) a modulator, operatively coupled to the combiner, for separately M-ary phase shift keying each sector component of the digitally combined input digital information signal; and (d) a filter, operatively coupled to the modulator, for separately baseband spectrally shaping each sector component of the M-ary phase shift keyed digital information signal to limit the bandwidth of a downlink transmission signal.

* * * * *